US008020701B2

(12) United States Patent
Berdelle-Hilge et al.

(10) Patent No.: US 8,020,701 B2
(45) Date of Patent: Sep. 20, 2011

(54) DEVICE FOR EMPTYING AN OPEN-TOPPED MAIL ITEM CONTAINER AND MAIL ITEM CONTAINER

(75) Inventors: Peter Berdelle-Hilge, Constance (DE); Thomas Buckenmaier, Constance (DE); Dietmar Oexle, Singen (DE); Armin Zimmermann, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/307,443

(22) PCT Filed: Jul. 5, 2007

(86) PCT No.: PCT/EP2007/056833

§ 371 (c)(1), (2), (4) Date: Feb. 18, 2009

(87) PCT Pub. No.: WO2008/003754

PCT Pub. Date: Jan. 10, 2008

(65) Prior Publication Data

US 2009/0236251 A1 Sep. 24, 2009

(30) Foreign Application Priority Data

Jul. 5, 2006 (DE) ......................... 10 2006 031 120

(51) Int. Cl.
*B65D 85/00* (2006.01)
*B65D 85/48* (2006.01)
*B65G 11/04* (2006.01)
*B65G 65/04* (2006.01)

(52) U.S. Cl. ......... 206/425; 206/449; 414/593; 414/403

(58) Field of Classification Search .................. 206/265, 206/37.5, 425, 449, 556, 731; 209/584, 900; 220/601; 271/162; 414/403, 404, 593

See application file for complete search history.

(56) References Cited

U.S. PATENT DOCUMENTS

| | | | | | |
|---|---|---|---|---|---|
| 1,859,865 | A * | 5/1932 | Davis | 414/593 |
| 2,627,972 | A * | 2/1953 | Roos | 206/731 |
| 3,840,172 | A * | 10/1974 | Zimmermann | 229/144 |
| 4,091,906 | A * | 5/1978 | Clarke et al. | 192/129 A |
| 4,416,374 | A * | 11/1983 | Smith et al. | 206/507 |
| 4,819,795 | A * | 4/1989 | Swaney | 206/278 |
| 4,946,157 | A * | 8/1990 | Gunther, Jr. | 271/163 |
| 5,104,114 | A * | 4/1992 | Gillmann | 271/181 |

(Continued)

FOREIGN PATENT DOCUMENTS

| | | | |
|---|---|---|---|
| CA | 1057783 | A1 | 7/1979 |
| DE | 2304331 | A1 | 8/1974 |
| DE | 2609106 | A1 | 10/1976 |
| DE | 10234516 | B4 | 7/2004 |
| EP | 1054741 | B1 | 5/2002 |
| EP | 1100629 | B1 | 7/2002 |
| FR | 2630412 | A1 | 10/1989 |
| FR | 2644760 | A1 | 9/1990 |
| FR | 2646620 | A1 | 11/1990 |
| WO | 9942225 | A1 | 8/1999 |

*Primary Examiner* — J. Gregory Pickett
*Assistant Examiner* — Kaushikkumar Desai
(74) *Attorney, Agent, or Firm* — Laurence A. Greenberg; Werner H. Stemer; Ralph E. Locher

(57) ABSTRACT

A device for emptying a mail item container that is open at the top and serves for transporting mail items. The mail item container has sidewalls and a container underside. The device has a lifting device for moving the mail items relative to the sidewalls. In order to enable postal articles, such as, for example, letter mail items, to be emptied from a mail item container in an ergonomically favorable and efficient manner without adversely affecting its mechanical stability to too great an extent, it is proposed that the lifting device is provided for passing through the underside of the container.

8 Claims, 5 Drawing Sheets

U.S. PATENT DOCUMENTS

| | | | | |
|---|---|---|---|---|
| 5,111,938 | A * | 5/1992 | Soprano et al. | 206/386 |
| D357,120 | S * | 4/1995 | Miller | D3/312 |
| 5,816,674 | A * | 10/1998 | Manos et al. | 312/290 |
| 6,286,827 | B1 * | 9/2001 | Meetze et al. | 271/162 |
| 6,503,044 | B1 * | 1/2003 | Enenkel | 414/404 |
| 6,575,306 | B1 | 6/2003 | Schuster et al. | |
| 6,663,100 | B2 * | 12/2003 | Crowley | 271/165 |
| 7,210,597 | B2 | 5/2007 | Enenkel et al. | |
| 7,533,879 | B2 * | 5/2009 | Marasco | 271/146 |
| 2002/0108951 | A1 * | 8/2002 | Zelko | 220/7 |
| 2003/0006174 | A1 | 1/2003 | Harres et al. | |
| 2003/0192900 | A1 * | 10/2003 | Petzitillo et al. | 220/812 |
| 2004/0226945 | A1 * | 11/2004 | Hsu et al. | 220/6 |
| 2005/0040064 | A1 * | 2/2005 | Killinger et al. | 206/425 |
| 2005/0161457 | A1 | 7/2005 | Enenkel et al. | |

* cited by examiner

DEVICE FOR EMPTYING AN OPEN-TOPPED MAIL ITEM CONTAINER AND MAIL ITEM CONTAINER

BACKGROUND OF THE INVENTION

Field of the Invention

The invention relates to a mail item container for transporting mail items, said mail item container having side walls, an open top side and a container underside that has a pass-through for a lifting means for lifting up the mail items, and having a base that is movable relative to the sidewalls in the direction of the top side.

For the purpose of sorting mail items in sorting systems, for example letters according to addresses, the mail items are brought to the sorting system in plastic containers. In order to sort the mail items, said containers must be unloaded and the mail items must be supplied to a singulating means, called a feeder. For this purpose it is known to position the containers filled with mail items close to a conveying means, e.g. a conveyor belt, and to remove the mail items from the containers stack by stack, one container at a time, place them onto the conveying means, and there form a singulating stack. This gripping operation is ergonomically unfavorable because the container walls are higher than the average mail item center of mass and as a result the operator is obliged to reach into the containers and lift the mail items out of the container.

EP 1 100 629 B1 discloses a device for emptying mail item containers wherein the mail item containers are emptied automatically in that a lifting comb engages laterally into a sidewall of the mail item container, the sidewall being slotted from above, moves under the mail items and lifts them out of the mail item container. However, the open recesses in the mail item container that are necessary for the lifting comb result in the mail item container being mechanically unstable.

The published unexamined German patent application DE 23 04 331 describes a mail item container in the form of a magazine into which a stack carrier engages from below through an opening in the base of the mail item container for the purpose of lifting and lowering mail items.

A mail item container having a plurality of slots arranged adjacent to one another and behind one another in the mail item container base to allow stack carriers to be passed through is known from DE 102 34 516 A1.

A further solution for unloading mail items from a mail item container is known from the published unexamined German patent application DE 26 09 106. Described therein is a mail item container that has a movable base and can be raised by means of bars that are guided through the container base in such a way that the mail items are lifted above the top edge of the mail item container.

BRIEF SUMMARY OF THE INVENTION

It is therefore the object of the invention to disclose a mail item container for transporting mail items which is mechanically stable and easy to empty.

In order to explain the invention a device for emptying a mail item container for transporting mail items is described, said mail item container being open at the top and having sidewalls and a container underside, also having a lifting means for passing through the underside of the container and for moving the mail items relative to the sidewalls. The sidewalls can remain without recesses that are open on both sides, as a result of which the mail item container remains stable against twisting and deforming. With the aid of the lifting means the mail items can be lifted up, with the result that an ergonomically unfavorable reaching into the mail item container and an energy-consuming and difficult lifting-out of the mail item stack that is movable per se is no longer necessary or necessary only to a lesser degree.

The sidewalls can remain without recesses that are open on both sides, as a result of which the mail item container remains stable against twisting and deforming. With the aid of the lifting means the mail items can be lifted up, with the result that an ergonomically unfavorable reaching into the mail item container and an energy-consuming and difficult lifting-out of the mail item stack that is movable per se is no longer necessary or necessary only to a lesser degree.

A mechanical loading of the container base in the event of a deformation of the mail item container toward a lozenge shape can be compensated by a sufficient number of and sufficiently wide ridges in the container base which allow sufficient possibilities for allowing the lifting means to pass through. The lifting means can be provided for raising the mail items relative to stationary sidewalls. The lifting means can equally well be provided for raising the mail items that are lifted from the mail item container relative to descending sidewalls, in which case they are stationary relative to the rest of the environment, such as e.g. a stand or a control unit of the device. The device can have an automatic drive for moving the lifting means or, as the case may be, lowering at least one sidewall. A device that is advantageous in terms of ease of manufacture can be created if the device is provided to allow a manual actuation of the lifting means or, as the case may be, to allow the pressing-down of the sidewalls.

The lifting means can have an elongate pusher arranged transversely with respect to the lifting direction for the purpose of lifting up the mail items. The pusher can be guided through the underside and placed directly in contact with the mail items, with many mail items being able to be lifted up simultaneously by means of a pusher shape that is, for example, plate-like, elongate transversely with respect to the lifting direction and narrow in cross-section, and with only a narrow slot being necessary in the base of the mail item container.

The mail items can in each case be lifted up by a plurality of pushers and a reliable lifting achieved thereby if the lifting means has a plurality of pushers offset transversely with respect to a longitudinal direction of the mail items that are stacked in the mail item container for the purpose of lifting up the mail items, in particular by means of a direct contact with the mail items. Advantageously, the lifting means comprises a plurality of pushers offset longitudinally with respect to a longitudinal direction of the mail items that are stacked in the mail item container. As a consequence of this arrangement the pushers can be distributed over the longitudinal direction of the container base, as a result of which the container base retains a high degree of stability.

The mail items in the mail item container can be lifted up particularly reliably with the aid a movable base in the mail item container. For that purpose the lifting means is beneficially provided for moving a container base that is movable relative to the sidewalls.

The object directed to the mail item container is achieved by means of a mail item container of the type cited in the introduction which, according to the invention, has two opposing sidewalls that are secured to the movable base and are movable together with the movable base. By means of said sidewalls the mail items can be prevented from falling down from the raised base. The sidewall secured to the base is beneficially an additional inner sidewall within an outer sidewall affording the mail item container its stability. It can be arranged in the stacking direction or transversely with respect thereto and be a longitudinal or narrow sidewall. Advantageously, the sidewall secured to the base is movable in the raised state of the base from a sidewall position into a position exposing the contents of a container. The mail items initially held by the sidewall can be released and thus easily taken hold of by an operator without the sidewall interfering with the seizing action. Movability, e.g. into the releasing position, can be achieved particularly easily if the sidewall secured to the base can be tilted relative to the base.

The sidewalls of the mail item container can remain without recesses that are open on both sides, as a result of which the mail item container remains stable against twisting and deforming. Furthermore, the mail items can be lifted up from below with the aid of the lifting means, with the result that an ergonomically unfavorable reaching into the mail item container and an energy-consuming and difficult lifting-out of the mail item stack that is movable per se is no longer necessary or necessary only to a lesser degree. The pass-through can be a hole- or slot-like opening in a container base. Equally, a larger open area is possible, e.g. for raising a movable base which forms the container base and is supported only at its edges.

A high degree of stability of the mail item container can be afforded if it has a container base disposed on the underside of the container and having elongate slots to allow the lifting means to be guided through. If the container base comprises a plurality of elongate slots offset with respect to one another in the transverse direction, the mail items can be reliably lifted up by means of a plurality of pushers simultaneously. With a plurality of elongate slots offset with respect to one another in the longitudinal direction, a slot running under all the mail items can be avoided and a high degree of stability of the mail item container achieved.

In an advantageous development of the invention the sidewalls include at least one elongate recess for accommodating the lifting means. An undercut can be achieved which counteracts a jamming of mail items in a slot between a sidewall and the lifting means. The recesses can be a slot or a groove and be embodied in particular for guiding the lifting means.

Good stackability of the mail item container can be achieved if at least one sidewall includes an upper wider and lower narrower area. Good protection against jamming of the mail items can be achieved in this case if the recess runs completely through the narrower area at least as far as the wider area. In order to counteract a possibility that the mail items will slip off from the lifting means during a lifting operation in the wide area, the wider area advantageously includes a blocking means for the purpose of preventing the mail items from extending completely into the wider area. The blocking means can be a molding of a sidewall inward, in particular around a handle of the mail item container.

By means of the movable base the mail items can be reliably lifted up and the lifting means can be implemented in a simple manner. In order to prevent the movable base from being lost, it is advantageously fixed at least indirectly to the sidewalls. It can be secured directly to the sidewalls, for example in a groove which is closed at the top and in which a molding of the base can run. A retaining means which changes its shape during a movement of the base, such as, for example, in the manner of a concertina, an accordion or lazy tongs, is particularly reliable and resistant to jamming. A stop advantageously limits an upward movement of the base.

In addition let a system be described having a mail item container that is open at the top and a device for emptying the mail item container which, according to the invention, has a lifting means for passing through an underside of the container for the purpose of moving the mail items relative to the sidewalls. An ergonomically favorable lifting of the mail items out of a stable mail item container can be achieved. The mail item container advantageously has a shape corresponding to the lifting means. The lifting means can engage e.g. in a positive locking manner into the base and reliably raise it.

The invention is explained in more detail with reference to exemplary embodiments that are illustrated in the drawings, in which:

DESCRIPTION OF THE INVENTION

Figure 1:
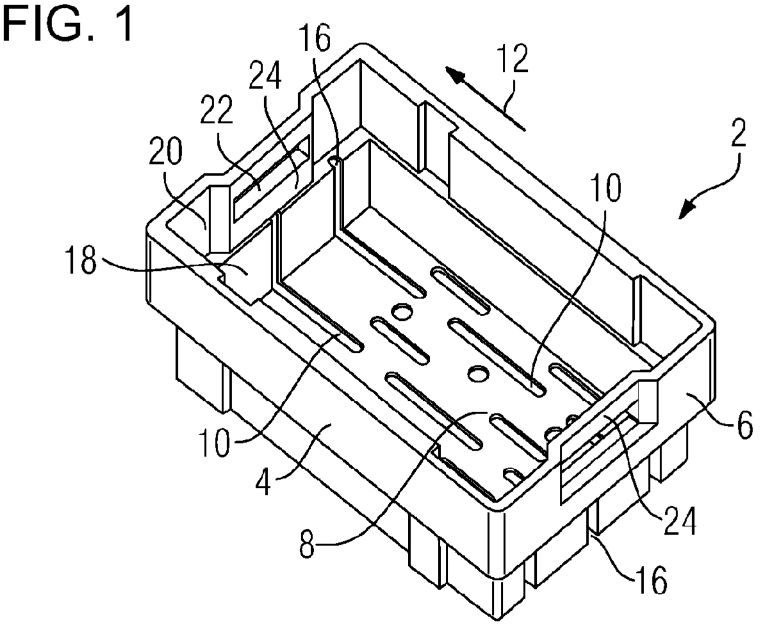
FIG. 1 shows a mail item container having slot-shaped pass-throughs through its container base.

FIG. 1 shows a mail item container 2 having sidewalls 4, 6, a container base 8 and an open top side. The container base 8 is joined in a single piece to the sidewalls 4, 6 and contains a plurality of elongate, slot-shaped pass-throughs 10 whose longitudinal direction runs in a stacking direction 12 of mail items 14 that are shown schematically in FIG. 2. The pass-throughs 10 are arranged—referred to their long extension direction—adjacent to one another in both the transverse direction and the longitudinal direction and have different lengths. Pass-throughs 10 adjoining the sidewalls 6 transition into recesses 16 in the sidewalls 6 which run completely through a lower narrower area 18 as far as an upper wider area 20 of the mail item container 2. The recesses, though embodied as outward-facing pass-throughs in FIG. 1, can also be implemented as grooves at least partially closed toward the outside and open toward the inside. The upper wide area 20 has handles 22 which are incorporated into inwardly offset blocking means 24 for the purpose of preventing lifted-up mail items 14 from extending completely into the wider area 20.

Figure 2:
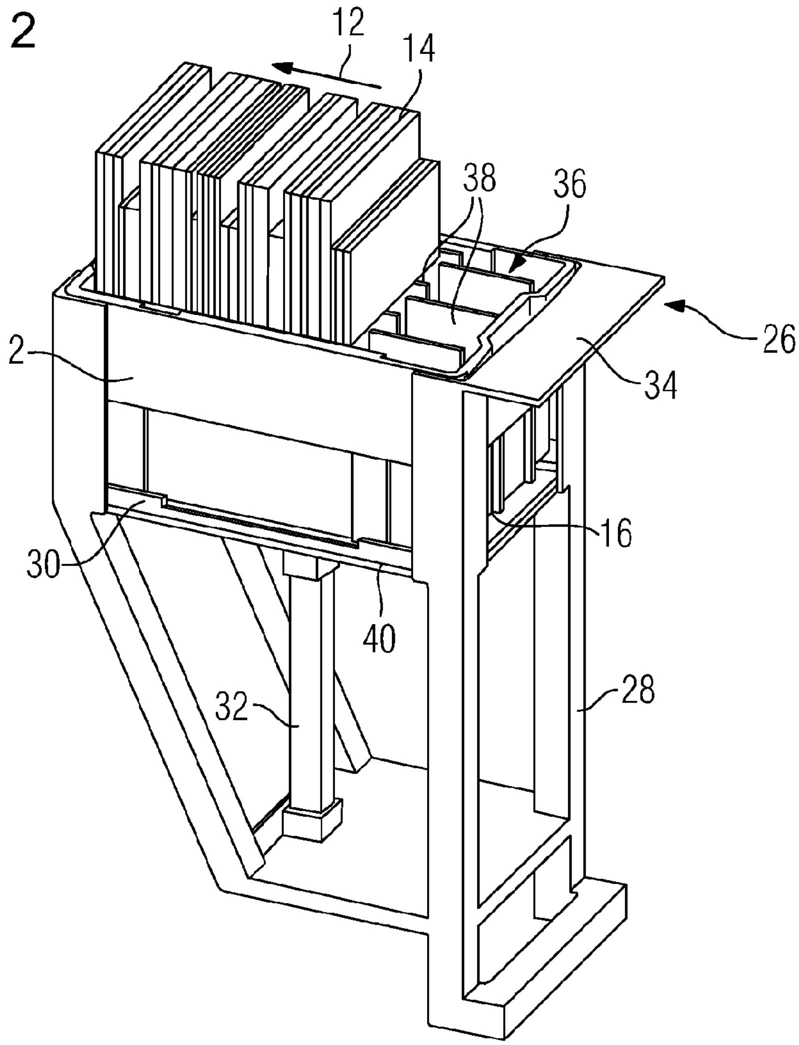
FIG. 2 shows the mail item container from FIG. 1 having a manual device for emptying the mail item container.

FIG. 2 shows a manual device 26 for emptying the mail item container 2. It has a base 28 and a level support 30 onto which the mail item container 2 can be placed. The support 30 is pressed upward by a spring device 32 having a compression spring as far as a support plate 34 and can be pressed downward against the spring force by pressure exerted by an operator onto a supported mail item container 2, as shown in FIG. 2. The support 30 has pass-throughs which are shaped analogously to the pass-throughs 10 in the mail item container 2.

The support 30 is part of a lifting means 36 having several plate-shaped pushers 38 that are elongate in the lifting direction and shaped so as to correspond to the pass-throughs 10. The pushers 38 of the lifting means 36 are rigidly joined to the base 28.

When the support 30 with the mail item container 2 placed thereon is lowered, the plates 38 engage through the pass-throughs of the support 30 and the pass-throughs 10 of the mail item container 2 and lift up the mail items 14 relative to the sidewalls 4, 6 during a corresponding downward movement of the mail item container 2 until they are essentially lifted completely out of the mail item container 2, as can be seen in FIG. 2. A stop 40 prevents the support 30 and the mail item container 2 from descending further. The mail items 14 can now be easily grasped by an operator without the latter having to lift the mail items 14 out of the mail item container 2. An undercut is formed in the sidewalls 6 by means of the lifting means 36 extending into the recesses 16 or, as the case may be, the pushers 38, said undercut preventing a jamming of mail items 14 in a slot between a sidewall 6 and the lifting means 36.

Figure 3:
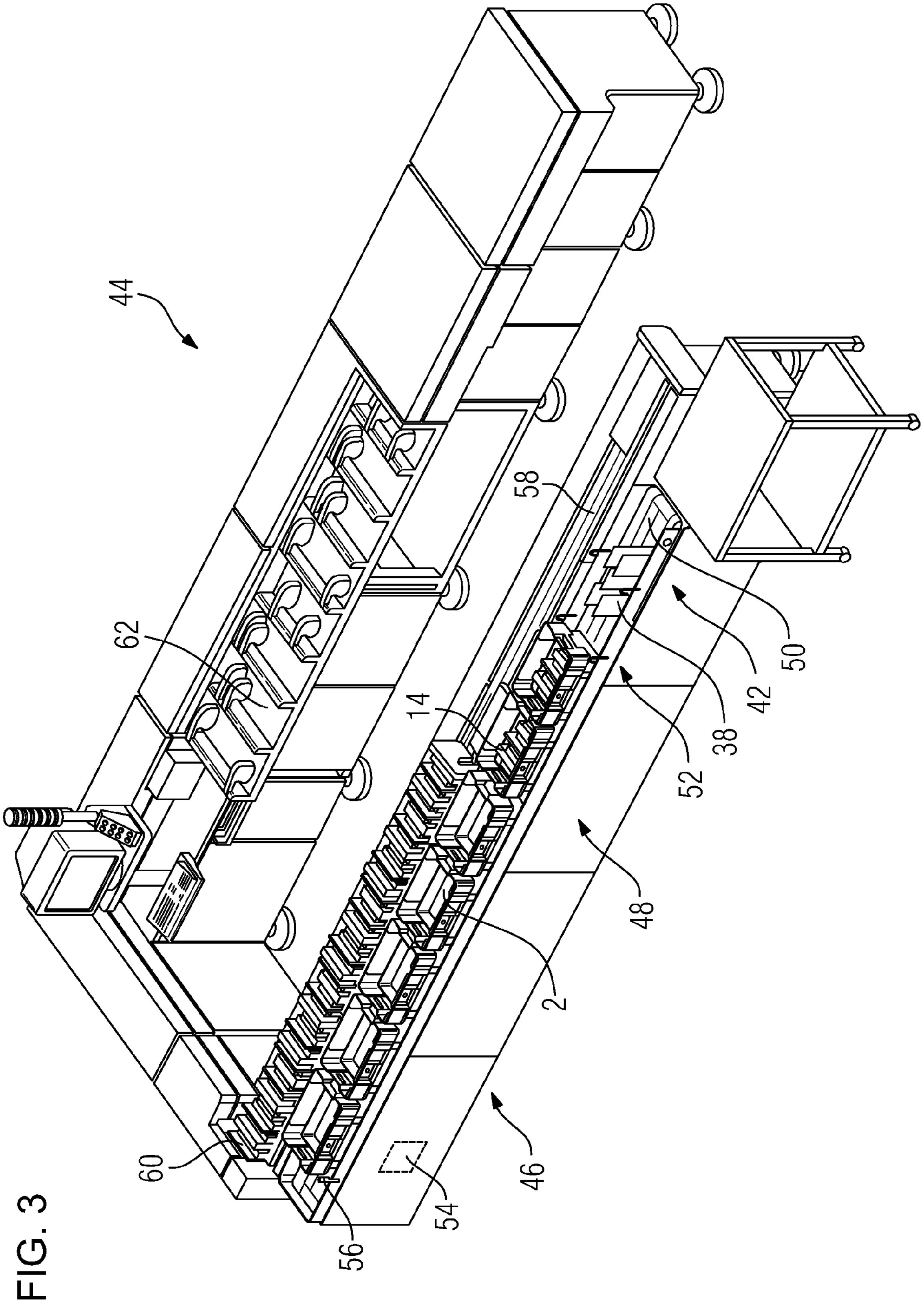
FIG. 3 shows a mail item sorting system having an automated emptying device with plate-shaped pushers.

An automated device 42 for emptying a mail item container 2 is shown in FIG. 3. The following descriptions are in each case restricted essentially to the differences from the preceding exemplary embodiments, to which reference is made in relation to features and functions that remain the same. Essentially unchanged components are basically numbered using the same reference signs. The device 42 is part of a mail item sorting system 44 having a mail item feeder system 46 which includes the emptying device 42. The mail item feeder system 46 has a container conveyor 48 having a two-part conveyor belt 50—a multi-part conveyor belt is equally well conceivable—between whose two belts arranged in parallel is a space through which plate-shaped pushers 38 of a lifting means 52 can be moved upward and guided through the pass-throughs 10 of the container base 8 of the mail item containers 2 as far as the mail items 14. The pushers 38 are arranged along the entire conveyor belt 50 underneath and between the two belts and can be activated individually or in groups by a control unit 54 according to the position of the mail item container 2 requiring to be emptied. For reasons of better illustration only, only one group of pushers 38 is shown activated—in other words in the raised position—in FIG. 3, where there is no mail item container 2. In an alternative exemplary embodiment, the pushers 38 can be movable along the conveyor belt 50, i.e. between the two belts of the conveyor belt 50, such that it is always the same pushers 38 that lift up the mail items 14.

In order to unload the mail item containers 2, the latter are moved along the conveyor belt 50 as far as a sensor 56 and stopped there. The pushers 38 arranged under the frontmost mail item container 2 are then moved upward in a controlled manner by the control unit 54 and guided through the container base 8 such that they lift up the mail items 14 and raise them partially or completely out of the mail item container 2. The raised mail items 14 are taken hold of by an operator and placed on a conveyor means 58 which transports the mail items 14 to a feeder means 60, where they are singulated in order to be sorted into compartments 62 in a subsequent sorting process. Gradually, all of the mail item containers 2 are now emptied, with the control unit 54 also keeping a count of the emptied mail item containers 2 and so always activating the lifting means 52 at the right position. Generally the kinematic reversal is also possible, such that the pushers 38 remain stationary in the vertical direction and the mail item container 2 that is to be emptied is moved downward, as has been described with reference to FIGS. 1 and 2.

Figure 4:
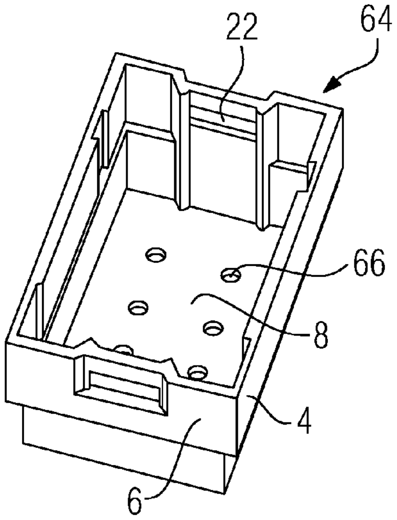
FIG. 4 shows a mail item container having round pass-throughs through its container base.
Figure 5:
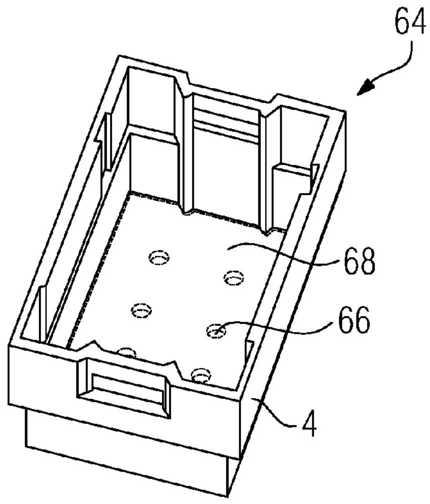
FIG. 5 shows the mail item container from FIG. 4 having an inserted movable base.

FIGS. 4 and 5 show an alternative mail item container 64 having a plurality of round pass-throughs 66 which are covered by a movable base 68, shown in FIG. 5, which is inserted between the sidewalls 4, 6 and rests on top of and in contact with the container base 8. Alternatively to the pass-throughs 66, the container base 8 can have a single large pass-through, such that the container base 8 is restricted to a supporting edge for the purpose of supporting the movable base 68 downward or even has only a small number of bearing elements projecting inward from the sidewalls 4, 6. In this case the base of the mail item container 2 is formed by the movable base 68.

Figure 6:
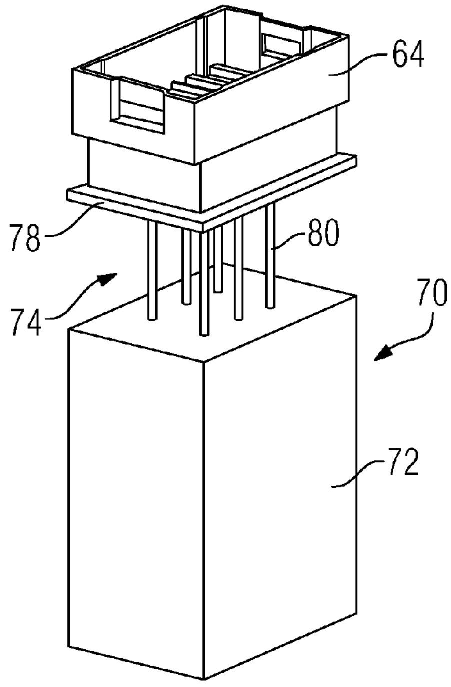
FIG. 6 shows a device for emptying the mail item container from FIG. 5 with a mail item container.
Figure 7:
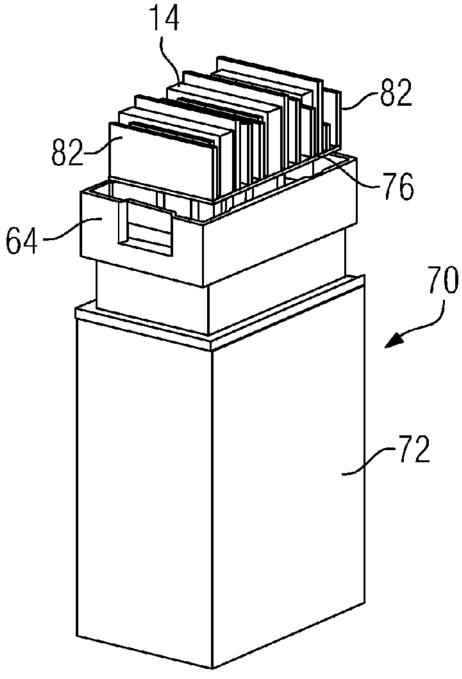
FIG. 7 shows the device from FIG. 6 with lowered mail item container.

FIGS. 6 and 7 show a device 70 for emptying a mail item container 64 as illustrated in FIG. 5, said device comprising a base 72 and a lifting means 74 for moving a movable base 68, 76. The lifting means 74 is implemented analogously to the lifting means 36 and comprises a support 78 and pushers 80 for raising the movable base 76 which has a shape corresponding to the pushers 80 into which the pushers 80 can engage, for example. The mail items 14 on the base 76 are held by means of two sidewalls 82 secured to the base 76 such that they do not fall down when the base 76 is raised and do not insinuate themselves between the base 76 and the sidewall 6 and become jammed there when the base 76 is lowered. The mail items 14 raised relative to the sidewalls 4, 6 can now be taken hold of by an operator and placed on a conveying means 58 for further processing.

Figure 8:
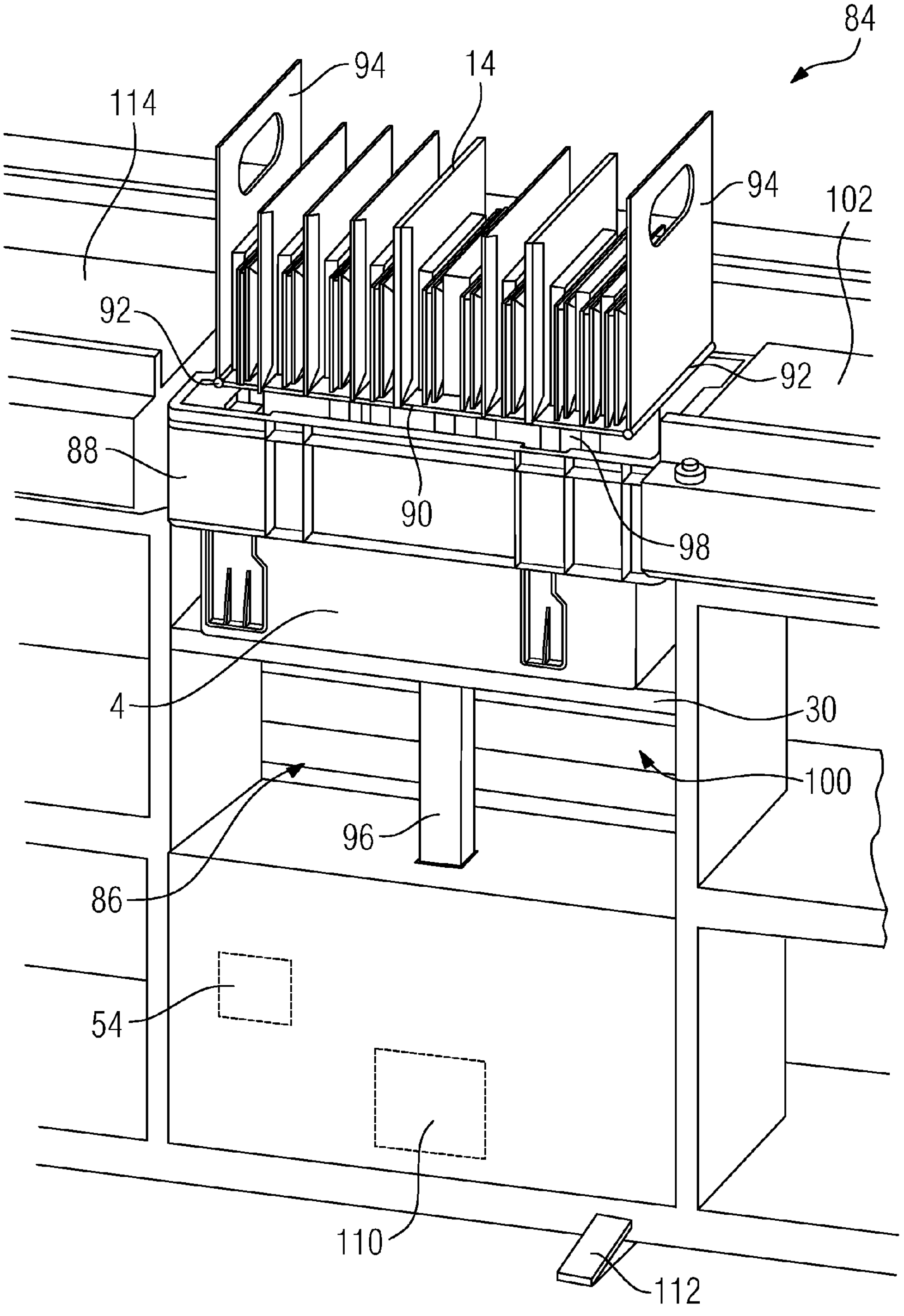
FIG. 8 shows a section of a mail item feeder system having an emptying device and a mail item container.

FIG. 8 shows a section of a mail item feeder system 84 having a device 86 for emptying a mail item container 88. The device 86 comprises a support 30 onto which the mail item container 88 is placed by an operator. Inserted into the mail item container 88 is a movable base 90 to which two movable sidewalls 94 are secured by means of hinges 92. Pushers 98 of a lifting means 100 that are held by a carrier 96 project from below through the support 30 and through an underside of the mail item container 88, such that they can be brought into contact with the movable base 90. In a starting position the support 30 is raised and essentially aligned flush with a conveying means 102.

Figure 9:
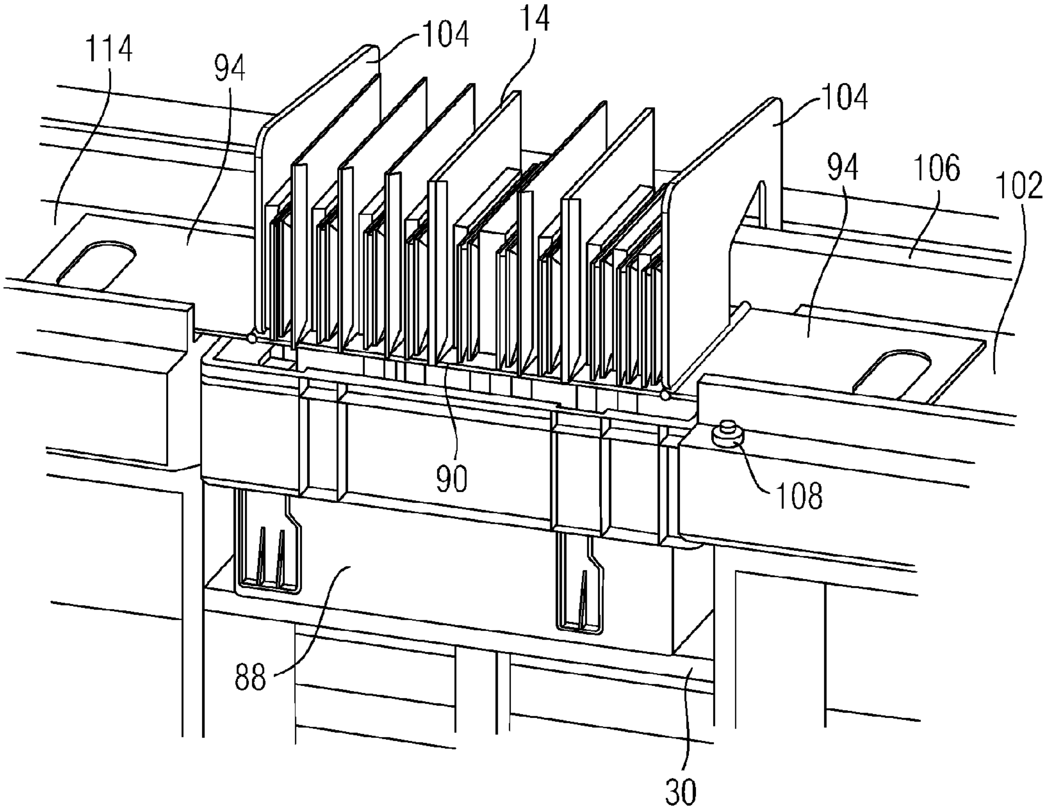
FIG. 9 shows the mail item container from FIG. 8 with sidewalls fixed to the raised base and folded down and with mail items held by two retaining means.

In order to empty the mail item container 88 the latter is placed onto the support 30 by the operator and pressed downward. In the process the support 30 travels downward, as shown in FIG. 8, in which case the pushers 98 remain stationary and raise the base 90 relative to the descending sidewalls 4, 6. With the container in the raised state, the operator can now fold down the sidewalls 94, as shown in FIG. 9, such that they are moved from a position holding the mail items 14 to a position releasing the mail items 14. The mail items 14 can then be taken hold of by the operator and pushed onto the conveying means 102 which is embodied for example as a conveyor belt and transports the mail items 14 to a feeder means 60. This operation can be assisted by means of retaining means 104 (FIG. 9), implemented for example as separating blades, which are positioned laterally against the stack of mail items 14 and hold it together. The retaining means 104 run in a guide 106 and can be moved in concert by the operator. An assistance can be achieved by means of a motorized drive of the retaining means 104 in the guide 106, as a result of which the mail items 14 can be automatically pulled onto the conveying means 102. The sidewalls 94 are subsequently folded into an upright position again, the mail item container 88 is raised and can be removed from the emptying device 86 in order to make room for a next full mail item container 88.

In a further embodiment, the emptying of the mail item container 88 can be assisted using automated means. After the operator has placed the mail item container 88 onto the support 30 as shown in FIG. 8, he or she actuates an input means

108, a button for example, which sends a signal to a control unit 54 which controls a raising of the carrier 96 by way of a drive 110. By this means the pushers 98 lift up the base 90 and with it the mail items 14 as far as the position shown in FIG. 8, in which the base 90 is positioned above a top edge of the sidewalls 4, 6 and aligned flush with the top edge of the conveying means 102. In this case, too, the kinematic reversal is a beneficial alternative exemplary embodiment in which the pushers 98 remain stationary and the mail item container 88 is moved vertically.

If a base 68 without sidewalls 82, 94 is used, control of the lifting movement by way of an input means 112 which leaves the hands of the operator free, e.g. a foot-operated switch, is beneficial. The operator's hands are free for holding the mail items 14 emerging from the mail item container 88 without the mail items 14 falling out of the mail item container 88. Control of the speed of movement of the carrier 96 by way of the input means 108, 112 is advantageous, for example in that a speed is dependent on a pressure applied to the input means 108, 112.

An even further automated device 86 for emptying the mail item containers 88 comprises a second conveying means 114 for transporting mail item containers 88 by means of which the mail item containers 88 are transported in from the left and pushed onto the support 30 that is raised in its home position. In this case the support 30 is aligned flush with a top edge of the conveying means 102 embodied as a conveyor belt. With the carrier 96 in the raised position—triggered automatically or manually—the support 30 is now lowered such that the sidewalls 4, 6 of the mail item container 88 are moved downward. The mail items 14 can then be unloaded, as described with reference to FIGS. 8 and 9. Subsequently, the support 30 is raised again and the empty mail item container 88 can be removed by the operator so that a next full mail item container 80 can be moved into position. Fully automated emptying can be achieved if the emptied mail item container 80 is transported away by means of a further conveying means for example at a lower level under the second conveying means 114.

Figure 10:
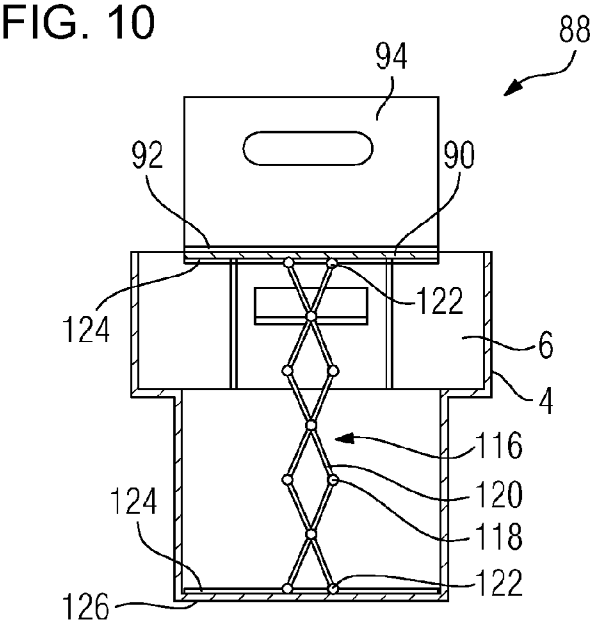
FIG. 10 shows a schematic sectional view through the mail item container from FIG. 9 with secured movable base.

FIG. 10 shows the empty mail item container 88 in a sectional view. The movable base 90 is indirectly secured to the sidewalls 4, 6 by way of a container base 126 in a captive manner by two securing means 116 which are implemented as what are termed lazy tongs having members 120 connected by means of articulated joints 118. The two securing means 116 are in each case arranged directly adjacent to the sidewalls 6 and run by means of rollers 122 in corresponding rails 124 of the container base 126 and of the movable base 90 in which they are secured. When the base 90 is lowered, the securing means 116 come to rest under the base 90 in such a way that they are kept clear of the mail items 14.

A mail item within the meaning of the invention can be postal articles of any kind.

The invention claimed is:

1. A mail item container for transporting mail items, comprising:

a container underside, sidewalls, and an open top side, said container underside having a pass-through formed therein for a lifting device for lifting up the mail items;

a movable base movably mounted relative to said sidewalls in a direction towards said top side; and two mutually opposing movable sidewalls fixed to said movable base and movable together with said movable base, said movable sidewalls each having respective hinges for securing said movable sidewalls to said movable base in a tiltable manner relative to said movable base, and in a raised state of said movable base, said movable sidewalls being movable from a sidewall position into a position exposing the contents of the container.

2. The mail item container according to claim 1, wherein said movable base is secured at least indirectly to said sidewalls.

3. The mail item container according to claim 1, which comprises a container base disposed on the underside of the container and having elongate slots formed therein, allowing the lifting device to pass through.

4. The mail item container according to claim 3, wherein said container base is formed with a plurality of elongate slots offset with respect to one another in a transverse direction.

5. The mail item container according to claim 3, wherein said container base is formed with a plurality of elongate slots offset with respect to one another in a longitudinal direction.

6. The mail item container according to claim 1, wherein said sidewalls are formed with at least one elongate recess for accommodating the lifting device.

7. The mail item container according to claim 6, wherein at least one of said sidewalls includes an upper wider area and a lower narrower area and said recess runs completely through said lower narrower area and reaches at least as far as said upper wider area.

8. The mail item container according to claim 7, wherein said upper wider area includes a blocking means for preventing the mail items from extending completely into said upper wider area.

* * * * *